United States Patent [19]
Prins

[11] 3,895,911
[45] July 22, 1975

[54] CYLINDRICAL TANK STERILIZER

[75] Inventor: Antoon Adrianus Prins, Breukelen, Netherlands

[73] Assignee: Schiedamsche Werktuigenen Machinefabriek N.V., Schiedam, Netherlands

[22] Filed: Aug. 28, 1972

[21] Appl. No.: 284,251

[30] Foreign Application Priority Data
Aug. 27, 1971 Netherlands ............... 7111843

[52] U.S. Cl. ............ 21/98; 99/364; 99/362
[51] Int. Cl. ............................ A23l 3/02
[58] Field of Search .......... 21/56, 78, 80, 94, 96, 21/98, 103; 99/211, 214, 216, 359, 360, 364, 366; 198/209, 211, 221, 222

[56] References Cited
UNITED STATES PATENTS

| | | | |
|---|---|---|---|
| 1,437,882 | 12/1922 | Barrows | 99/364 X |
| 2,645,557 | 7/1953 | Lewis et al. | 21/98 X |
| 3,020,825 | 2/1962 | Schmidt | 99/362 |
| 3,365,311 | 1/1968 | Schmidt | 99/214 |

FOREIGN PATENTS OR APPLICATIONS

| | | | |
|---|---|---|---|
| 104,613 | 4/1963 | Netherlands | 21/78 |

*Primary Examiner*—Joseph Scovronek
*Assistant Examiner*—Timothy W. Hagan
*Attorney, Agent, or Firm*—Cooper, Dunham, Clark, Griffin & Moran

[57] ABSTRACT

In a sterilizer of the type having a cylindrical tank and a drum therein which is rotatable relative to the tank for receiving objects to be sterilized such as cans, milk bottles and the like, and wherein the tank is provided with a sealable opening with a cover to be opened and closed manually, forming part of the cylinder jacket, whereby the objects, after opening said cover, are loaded or unloaded manually, the improvement wherein the sterilizer is so constructed with one sealable opening disposed eccentrically in one of the heads of the tank which is disposed horizontally, while in the other head there is an identical sealable opening, the former opening being destined for loading and the other opening for unloading the drum, thereby permitting mechanical loading and unloading attaining a considerable gain of time and reduction of the work to be done.

4 Claims, 6 Drawing Figures

3,895,911

CYLINDRICAL TANK STERILIZER

BACKGROUND OF THE INVENTION

The invention relates to a sterilizer of the type having a cylindrical tank and a drum rotatable therein relative to the tank for receiving objects to be sterilized, such as cans, milk-bottles and the like, the tank being provided with a sealable opening through which the drum can be loaded or unloaded.

Such sterilizers are known. They are used for sterilizing, viz. the destruction of bacteria in canned food or bottled milk and the like. These sterilizers are provided with a cover to be opened and closed manually, which forms part of the cylinder jacket. After opening the cover the objects to be sterilized are placed by hand in the drum which is rotatable inside the tank. After closing the cover the sterilizer can be set in operation by introducing water or steam under pressure at for example 1.5 atm. The drum can rotate during said operation.

After the sterilization period of for example 60 minutes has elapsed, the sterilizer is again emptied manually via the discharging opening.

SUMMARY OF THE INVENTION

The present invention provides such a sterilizer which is suitable for mechanical filling and emptying, and is so constructed that the sealable opening is disposed eccentrically in one of the heads of the tank, which is disposed horizontally, while an identical sealable opening is to be found in the other head, the first opening being destined for loading and the other opening for unloading the drum.

Thus it is attained that after completion of the sterilization operation, the objects in the rotary drum can be removed in the same direction from the sterilizer and followed by objects yet to be treated, introduced in the same direction. The backward and forward movement of the objects when use is made of a batch sterilizer of the known type is thus avoided.

The sterilizer according to the invention moreover is so constructed that both of the openings are composed of a plurality of particularly circular holes, whose centers lie on a straight, which line runs horizontally and perpendicularly intersects or crosses a radius drawn from the rotation center line of the drum at a given distance. The drum is provided with a series of axial tubes, arranged such that the tubes through stepwise rotation of each series can be brought in line with the holes of the charging and at the same time discharging opening.

Furthermore the sterilizer according to the invention can be so constructed that in the axial extension of the tank and contiguous with the loading and unloading openings, there are disposed a supply and a discharge track, the former being provided with an intermittently operating insertion mechanism.

Through this, a completely automatic charging and discharging of the sterilizer is attained.

It is observed that another sterilizer is known wherein the loading and unloading openings are eccentrically disposed in the end walls of a cylindrical tank, which openings are provided with rotatable sealing means which are operated through conical gear assemblies. In its vertically oriented tank there are disposed along the cylinder wall side a series of annular plates, axially offset in one place, whereon blocks within openings of discs engaging between the plates and rotating about the center line of the tank are caused to roll over the annular plates, thus displacing themselves helically from the top downwards.

The sterilizer according to the invention can also be so constructed that a plurality thereof may be arranged in a sequential system including a supply track provided with branches having switches and distributor stations to each of the sterilizers to permit continuous loading and unloading.

With the thus obtained installation after loading the first sterilizer the process therein can start and immediately thereafter the second sterilizer can begin loading.

The number of sterilizers thereby is so chosen that the sum of the periods of loading, for each sterilizer for instance 20 minutes, is equal to the sterilization treatment period, for instance 60 minutes. According to this numerical example four sterilizers are required. Thus a completely continuous operation is attained, whose continuity corresponds with that of the known continuous sterilizer, it being a considerable advantage in the present system that the installation costs are reduced to a minimum. For instance an installation with four sterilizers according to the invention will at most cost 50% in comparison to a continuous sterilizer.

BRIEF DESCRIPTION OF THE DRAWINGS

The invention will now be explained with reference to the drawings, rendering a non-restrictive embodiment according to the invention.

It is observed that in all figures the same reference numerals are used for the same portions.

DETAILED DESCRIPTION OF THE PREFERRED EMBODIMENT

Figure 1:
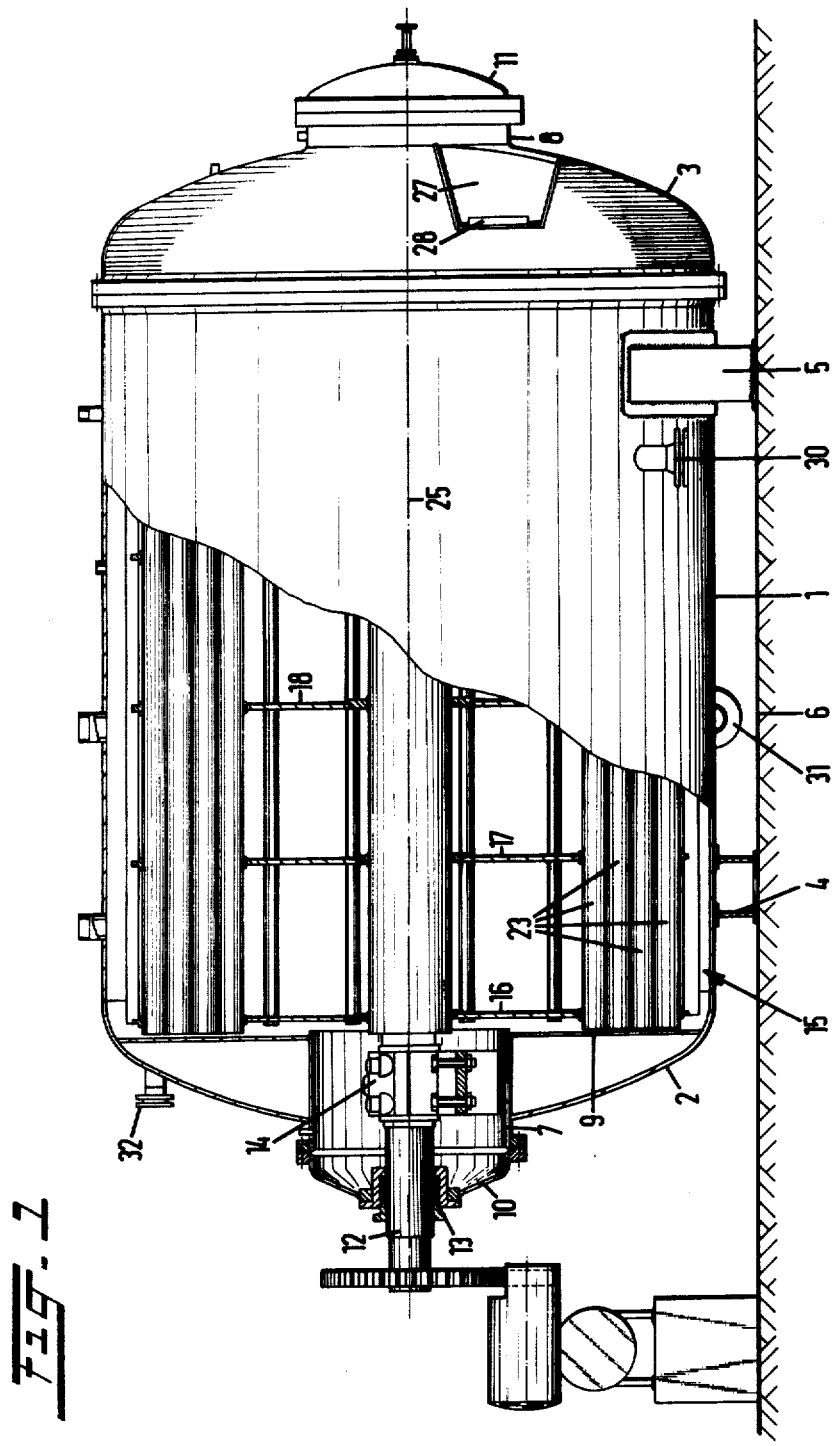
FIG. 1 is a side view, partly in longitudinal cross-section of the sterilizer.

As shown in FIG. 1, a sterilizer according to the present invention comprises a cylindrical tank 1 with two partly spherical heads 2, 3. The tank is fixedly disposed on two feet 4, 5 bearing on the floor 6. Centrally in each head there is a wide branch 7, 8 resp. which also extend inwardly and whereon is mounted (as shown only in branch 7) a flat plate 9 perpendicularly thereto, partly welded into the head.

Plate 9 and its counterpart at the opposite side in head 3, form non-co-rotating end faces of the drum 15. The branches are each shut off by a cap 10, 11, resp. The cap 10 which is the left one in FIG. 1 is provided with a central opening wherethrough extends a shaft 12 which is enclosed fluid- and pressure-tight by a packing system 13, and supported rotatably in a bearing 14 present in the branch 7. The construction at the right-hand branch 8 is the same but the shaft 12 does not extend through the cap 11.

Figure 3:
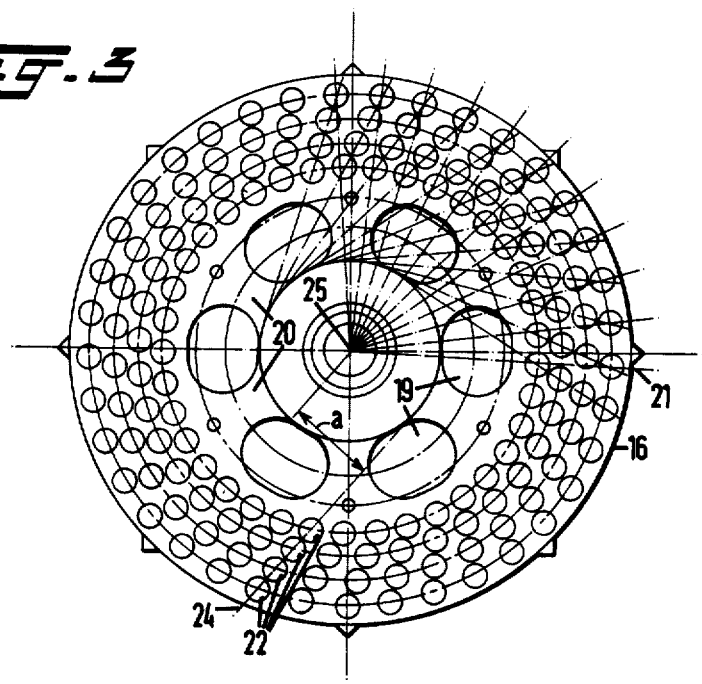
FIG. 3 is a front view of the rotary drum.

The shaft 12 carries and drives a drum 15 (see also FIG. 3), which comprises a plurality of radial plates 16, 17 and 18 and another two not shown, wherein adjacent the shaft are disposed recesses 19 which, between them, form wide spokes 20. From the circumferential edge 21 of the plates there is a zone wherein a plurality of series of holes 22 of circular shape are disposed. In the holes are inserted open cylindrical metal cages 23 extending over the entire length of the drum. Each set in the series of holes, may contain four holes as shown in FIG. 3, and is so designed that the centers of the holes lie on a straight line 24, whose extension perpendicularly crosses or intersects a radius drawn from the center line 25 of the shaft at a distance a.

Figure 2:
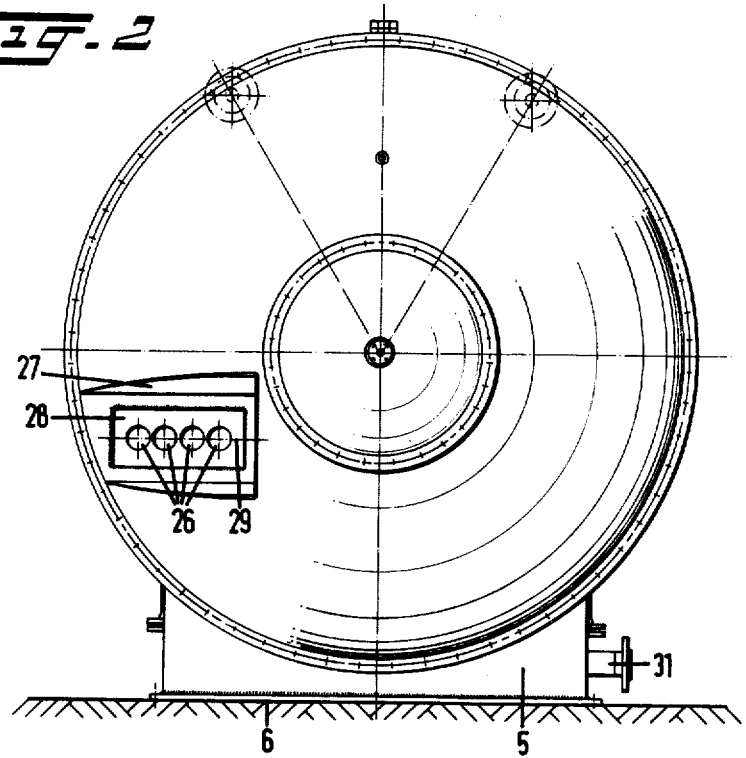
FIG. 2 is an end view of the sterilizer shown in FIG. 1.

This location of the series of holes is such that each time rotation of the drum is stopped, one set thereof will lie flush with four equally circular holes 26 in the tank head, see FIG. 2, which form the loading and unloading openings.

FIGS. 1 and 2 only show the loading opening which is to be found in a recessed portion 27 of the head 3. The holes lie in a flat plate 28 which is disposed against the bottom of the recess, in a plane perpendicular to the shaft center line 25 but disposed outwardly relative to the branch 8. The holes 26, which lie with their centers on a horizontal line 29, are sealable fluid- and pressure-tight by means of a non-shown device or other suitable means known in the art.

The sterilizing is effected with a hot fluid, e.g. steam at 1.5 atm and 125°C, for which purpose supply and discharge branches 31, 32 are disposed in the tank wall and head wall, respectively.

If the drum is completely filled, the loading and unloading openings are closed and the steam is introduced in the tank. The drum, through the shaft 12, is continuously or intermittently rotated for a maximally effective heat transfer of the steam via the wall of the objects in the cages 23 to be treated.

Prior to proceeding to the sterilization, the drum with the objects to be treated should be loaded or filled. Assuming that the objects comprise cylindrical cans, they may be suitably transported track 39 and switches 40 to a distributor station 38 (see FIG. 6).

Figure 4:
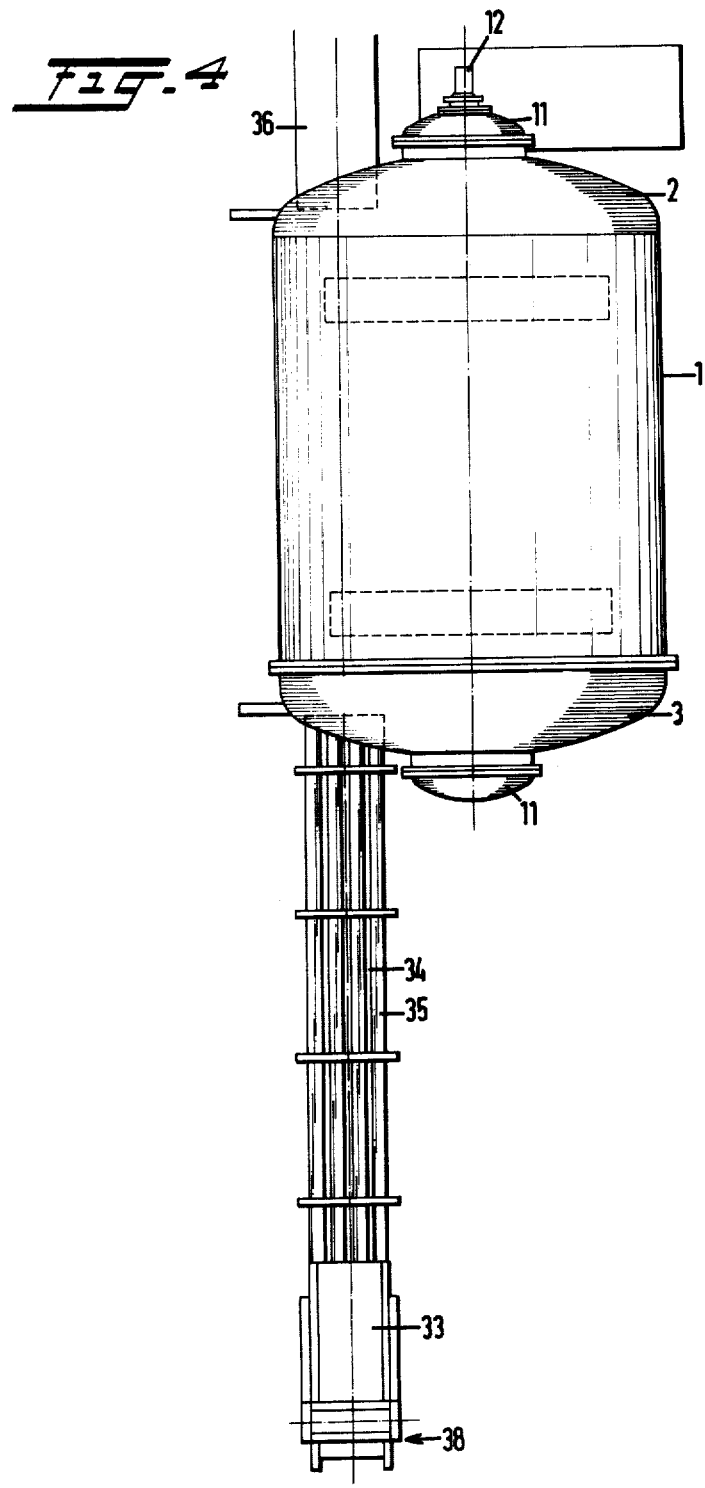
FIG. 4 is a top view of the sterilizer with supply and discharge tracks.
Figure 5:
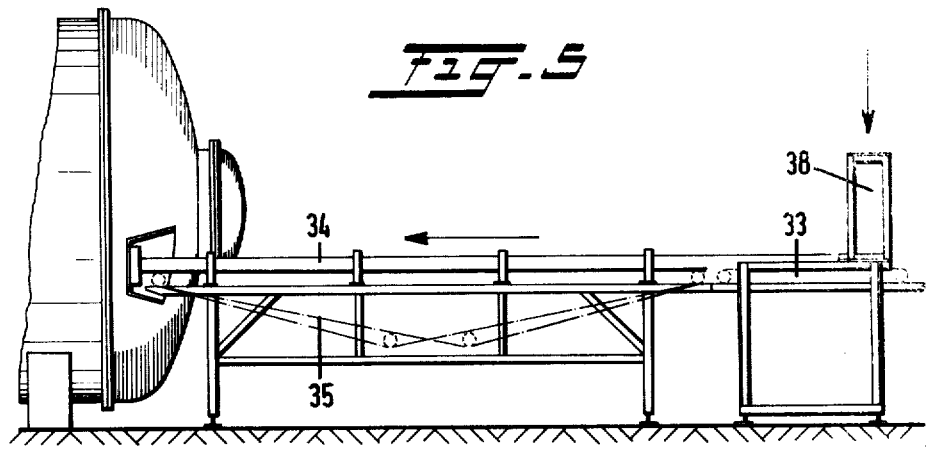
FIG. 5 is a side view thereof.

The cans, which arrive one after the other, are subsequently grouped by the distributor station 38 into rows of 4 pieces in side-by-side relationship (see also FIGS. 4 and 5). A belt conveyor 33, which runs under the distributor station 38, transports the cans to a chain conveyor 34 which is provided with inverted V-shaped guides.

The rows of cans are grouped on the chain conveyor 34 through the functioning of the belt conveyor 33 with their flat sides against each other to form four adjacent blocks or columns until reaching a length corresponding with that of the drum 15.

The chains 35 of the chain conveyor 34 are each provided with two projections which press the successive blocks of cans into the cages 23 of the drum 15.

At the reversing end of the chain conveyor 34 adjacent the sterilizer is mounted a pushing-in mechanism 36, which comes into operation as soon as the projections of the chains 35 leave the last cans of the blocks and which pushes the blocks further into the cages 23 of the drum 15.

This results in a complete loading of the sterilizer and it avoids the possibility that the rotation of the drum 15 will be blocked by poorly loaded cans.

The non-drawn pushing-in mechanism comprises cross beam movable in the direction of the chain conveyor 34 and guided thereabove with vertically swinging arms.

After passing the last cans of the blocks, the pushing-in mechanism is moved by projections at the two outer chains in the direction of the sterilizer. At the same time the arms swing downwardly and engage with their front side the flat sides of the last cans. The continuous motion presses the blocks into the sterilizer because the arms can penetrate the cages 23 sufficiently far. After the bending of the chains 34 the pushing-in mechanism looses its chain drive and automatically returns to its initial position, while the arms swing in upward direction.

Since said four holes 26 are each time brought in line with four cages 23, four rows of cans can be simultaneously inserted. After filling a series of cages, the drum is rotated such that a following appropriate series of cages arrives before the holes 26 and again four rows of cans can be inserted.

If the sterilization has been completed after for instance 60 minutes, the next row of cans supplied via the chain conveyor will push forward the already treated row of cans through the discharging opening, whose holes in the head 2 are disposed in the same manner and place as in head 3, to register with the cages 23. The treated cans then arrive on a discharge conveyor 36.

Figure 6:
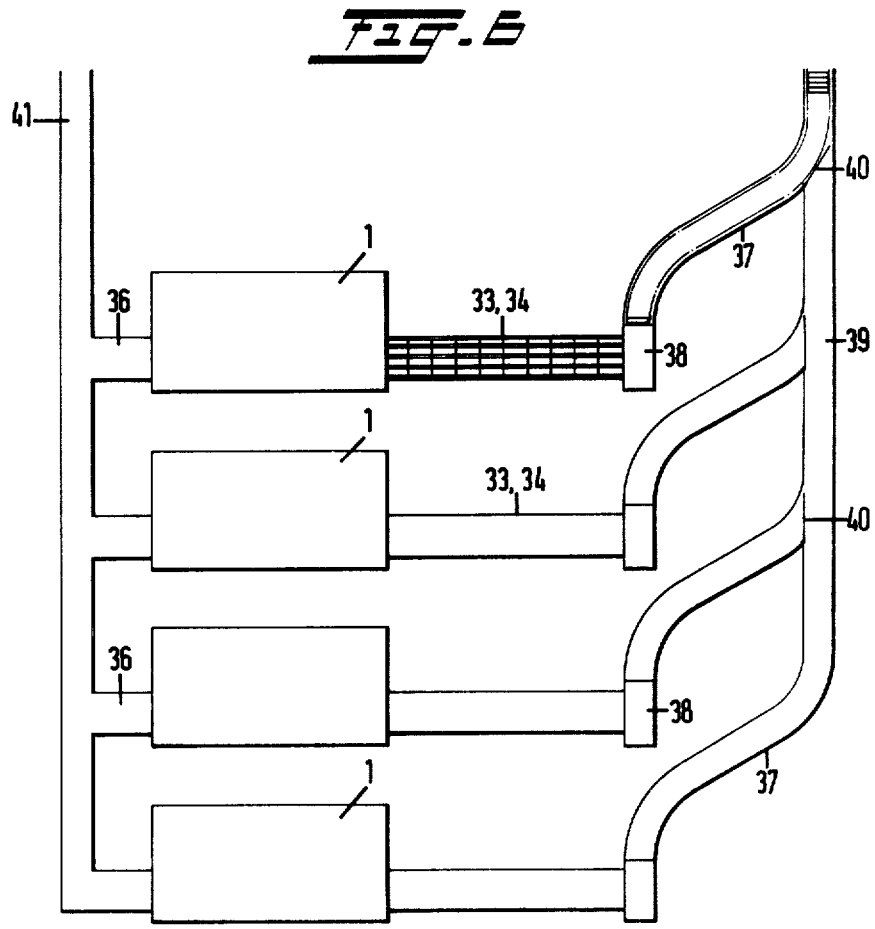
FIG. 6 is a diagrammatic top view of an installation having four sterilizers according to the invention and the supply and discharge tracks.

FIG. 6 finally shows an installation having four sterilizers 1. These are in mutually parallel relationship and are each provided with supply conveyors 33, 34 and a discharge conveyor 36. Lateral chutes 37 connect to the beginning of the belt conveyors 33 via distributor stations 38, which distribute the cans which have been supplied in transverse position from a central stock over the four rows. The lateral chutes branch from a supply track 39 with switches 40 which are so operated that the cans are conducted to the particular sterilizer to be filled. In FIG. 6 this is the top most sterilizer.

At this time the other sterilizers will be in operation. Assuming that the sterilizer loading period is 20 minutes, the operation may be synchronized such that the lower sterilizer will just arrive at the end of the treatment as filling of the topmost sterilizer is completed, while, the intermediate sterilizers will have been in operation for 20, or 40 minutes. After the upper sterilizer has been filled one can proceed to emptying and filling the lower sterilizer.

The discharge conveyers 36 can end in a common discharge chute 41.

It will be clear that the sterilizer is not restricted to the embodiment as described in the above and shown in the drawing. For instance the drum may also be adapted to treat milk packed in bottles, plastic or the like or other products.

We claim:

1. In a sterilizer of the type having a cylindrical tank with a head on each end and a drum therein rotatable relative to the tank about its central axis for receiving objects to be sterilized such as cans, milk bottles or the like, the tank being provided with a sealable opening via which the drum can be charged or discharged, the improvement wherein the tank is arranged with its central axis substantiall horizontal and the sealable opening comprises:

a first opening disposed eccentrically in one of the heads of the tank and a second opening similarly disposed in the other head, in axial alignment with said first opening, each of said first and second openings comprising a plurality of object accommodating holes, having centers spaced along a straight line which is substantially horizontal and perpendicularly intersects a vertical plane containing the rotation center line of the drum, at a given distance vertically from said rotation center line; and said drum comprises a series of sets of tubular cages, each cage accommodating the objects end to end in a column with their longitudinal axes aligned, and with the center lines of all the cages in a set disposed parallel to the rotation center line of the drum and spaced in correspondence with the spacing of said holes along a straight line which perpendicularly intersects a radius drawn from the rotation center line of the drum, at said given distance, whereby through stepwise rotation each set of cages can be brought in line with the holes of the first and second openings at the same time so that the first opening may be used for loading a plurality of columns of objects to be sterilized into the drum while the second opening is used for simultaneously discharging a similar plurality of columns of sterilized objects from the drum.

2. A sterilizer according to claim 1 wherein said tubular cages comprise elongated cylinders.

3. A sterilizer according to claim 1 further comprising a supply track and a discharge track respectively, contiguous to the loading and discharge openings, the supply track being provided with an intermittently operating pushing-in means for loading said drum.

4. A sterilizer according to claim 1, comprising a plurality of tanks disposed side by side and, a supply track comprising branches having switches and distributor stations to each of the sterilizers.

* * * * *